(12) United States Patent
Chrabieh et al.

(10) Patent No.: US 7,983,356 B2
(45) Date of Patent: Jul. 19, 2011

(54) ENHANCED FREQUENCY DOMAIN SPREADING

(75) Inventors: Rabih Chrabieh, San Diego, CA (US); Samir S. Soliman, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1054 days.

(21) Appl. No.: 11/772,092

(22) Filed: Jun. 29, 2007

(65) Prior Publication Data

US 2009/0004984 A1   Jan. 1, 2009

(51) Int. Cl.
*H04L 27/00* (2006.01)
*H04J 11/00* (2006.01)
(52) U.S. Cl. .................. 375/295; 370/208; 370/210
(58) Field of Classification Search .................. 375/260, 375/295; 370/206, 208, 210; 708/403, 404
See application file for complete search history.

(56) References Cited

U.S. PATENT DOCUMENTS

| 7,653,122 | B2* | 1/2010 | Siriwongpairat et al. | .... 375/146 |
| 2004/0085892 | A1* | 5/2004 | Walton et al. | ................. 370/208 |
| 2007/0082633 | A1* | 4/2007 | Carbone et al. | ............ 455/166.2 |
| 2007/0091983 | A1* | 4/2007 | Siriwongpairat et al. | .... 375/130 |
| 2007/0192394 | A1* | 8/2007 | Wang et al. | ................... 708/404 |
| 2008/0043861 | A1* | 2/2008 | Moffatt | ........................ 375/260 |

OTHER PUBLICATIONS

Takeda et al., "Time Domain Spreading and Frequency Domain Spreading for Delay-Time Code Diversity Multi-Access," IEEE Publication on Vehicular Tec. Conference, 2008, pp. 1529-1533.*

* cited by examiner

*Primary Examiner* — Tesfaldet Bocure
(74) *Attorney, Agent, or Firm* — QUALCOMM Patent Group; James H. Yancey, Jr.; Jeff Jacobs

(57) ABSTRACT

A system and method are provided for using frequency domain spreading to generate real signals in the time domain. The method supplies a first complex frequency domain symbol ($\alpha$) and a second complex frequency domain symbol ($\alpha_i$), and maps ($\alpha+j\alpha_i$) onto a subcarrier (+f). Further, ($\alpha-j\alpha_i$)* is mapped onto a mirror subcarrier (−f). The mappings are converted into a complex time domain symbol carrying $\alpha$ and $j\alpha_i$ in a single inverse fast Fourier transformation (IFFT). The real component of the complex time domain symbol ($\alpha$) is initially supplied, and subsequently supplied is an imaginary component of the complex time domain symbol ($\alpha_i$). The real symbol component ($\alpha$) is supplied by carrying $\alpha$ on the subcarrier (+f), and carrying ($\alpha$)* on the mirror subcarrier (−f). The imaginary symbol component $\alpha_i$ is supplied by carrying $\alpha_i$ on the subcarrier (+f), and carrying ($\alpha_i$)* on the mirror subcarrier (−f).

38 Claims, 8 Drawing Sheets

ENHANCED FREQUENCY DOMAIN SPREADING

BACKGROUND

1. Field

This invention relates generally to wireless communications and, more particularly, to systems and methods for using frequency domain spreading to mimic the results of time domain spreading in the generation of real signals in the time domain with reduced processor power consumption.

2. Background

Ultra-wideband (UWB) communication protocols are described in the Ecma-368 High Rate Ultra Wideband PHY and MAC standard. Generally, the Federal Communications Commission (FCC) defines UWB as a system using a bandwidth that exceeds the lesser of 500 megahertz (MHz), or 20% of the center frequency. The FCC uses −10 dB emission points to determine bandwidth, and to define the center frequency. UWB technology may be applicable to high and low data rate personal area networks (PANs). The advantage of the large bandwidth is that the system should be able to deliver high date rates over short distances, while sharing the spectrum with other communications systems. For this reason, the FCC has authorized the unlicensed use of UWB in the band between 3.1 gigahertz (GHz) and 10.6 GHz.

UWB can be generated as a pulse type system, where each transmitted pulse occupies the entire UWB frequency bandwidth. Alternately, an aggregation of narrowband subcarriers is used to generate at least 500 MHz of frequency bandwidth. For example, an orthogonal frequency division multiplexing (OFDM) system may be used. OFDM splits the digital information to be transmitted over a plurality of parallel slower data rate streams. Each of the parallel data streams is modulated onto a particular subcarrier, using a technique such as quadrature phase shift keying (QPSK) for example, and transmitted at a relatively low data rate. The subcarrier frequency is chosen to minimize crosstalk between adjacent channels, which is referred to as orthogonality. The relatively long symbol duration helps minimize the effects of multipath, which is the degradation caused by signals arriving at different times.

FIG. 1 is a schematic block diagram of a conventional QPSK modulation transmitter (prior art). A baseband processor 102 has an input on line 104 to accept digital information form the Media Access Control (MAC) level. The baseband processor 102 includes an encoder 106 having an input on line 104 to accept digital (MAC) information and an output on line 108 to supply encoded digital information in the frequency domain. An interleaver 110 may be used to interleave the encoded digital information, supplying interleaved information in the frequency domain on line 112. The interleaver 110 is a device that converts the single high speed input signal into a plurality of parallel lower rate streams, where each lower rate stream is associated with a particular subcarrier.

An inverse fast Fourier transform (IFFT) 114 accepts information in the frequency domain, performs an IFFT operation on the input information, and supplies a digital time domain signal on line 116. A digital-to-analog converter 118 converts the digital signal on line 116 to an analog baseband signal on line 120. A transmitter 122 modulates the baseband signal, and supplies a modulated carrier signal as an output on line 124. Note: alternate circuitry configurations capable of performing the same functions as described above would be known by those with skill in the art.

The input signal to the transmitter is mixed with a local oscillator (LO) signal, for upconversion to a radio frequency signal. The upconverted RF signal is quadrature modulated through separate in-phase (I) and quadrature (Q) channels before being recombined. After some filtering and power amplification, the filter can be radiated through an antenna.

In an effort to save power in portable battery-operated devices, some OFDM systems use only a single channel for transmission. For example, the device may be fabricated with only a I channel, or a Q channel that can be selectively disengaged.

Time domain spreading (TDS) and frequency domain spreading (FDS) are two techniques that are used to enhance communication throughput by providing redundant information. The TDS approach to redundancy is to repeat information in multiple transmissions. This simple approach to redundancy permits the baseband processor to be disengaged during repeating transmissions, which is another means of saving power. However, TDS offers relatively poor diversity protection against interference. The FDS approach to redundancy is to assign the same information to symmetrical subcarriers. However, the FDS operations typically occur before inverse fast Fourier transformation (IFFT) in the baseband processor, and offer a smaller measure of processor power savings.

SUMMARY

Wireless communication devices face the conflicting goals of enhancing communications, while reducing power consumption. The present disclosure presents systems and methods for using a special condition of FDS operation to provide an equivalent to low-power TDS. After carrier mapping, a single IFFT operation on the frequency-spread input is able to generate 2 separate time domain signals for each subcarrier. The resultant transmissions enjoy the benefits of FDS, while operating the IFFT at half the typical rate.

Accordingly, a method for using frequency domain spreading to generate real signals in the time domain. The method supplies a first complex frequency domain symbol ($\alpha$) and a second complex frequency domain symbol ($\alpha_i$), and maps ($\alpha+j\alpha_i$) onto a subcarrier (+f). Further, ($\alpha-j\alpha_i$)* is mapped onto a mirror subcarrier (−f). The mappings are converted into a complex time domain symbol carrying $\alpha$ and $j\alpha_i$ in a single inverse fast Fourier transformation (IFFT). The real component of the complex time domain symbol ($\alpha$) is initially supplied, and subsequently supplied is an imaginary component of the complex time domain symbol ($\alpha_i$).

More explicitly, the real symbol component ($\alpha$) is supplied by carrying $\alpha$ on the subcarrier (+f), and carrying ($\alpha$)* on the mirror subcarrier (−f). Likewise, the imaginary symbol component $\alpha_i$ is supplied by carrying $\alpha_i$ on the subcarrier (+f), and carrying ($\alpha_i$)* on the mirror subcarrier (−f). Alternately expressed, $\alpha$ and $\alpha_i$ are supplied as information represented on a real axis of a complex time domain plane, but not as information represented on an imaginary axis of the complex time domain plane. Thus, $\alpha$ and $\alpha_i$ are complex time domain signals that can be supplied exclusively via an in-phase (I) channel.

Consistent with UWB, the method supplies a plurality of first complex frequency domain symbols ($\alpha_n$) paired with a plurality of second complex frequency domain symbol ($\alpha_{n+i}$). Each ($\alpha_n+j\alpha_{n+i}$) pair is mapped onto a subcarrier (+$f_n$), and each ($\alpha_n-j\alpha_{n+i}$)* pair is mapped onto a mirror subcarrier (−$f_n$). The mappings are converted into a complex time domain signal carrying $\alpha_n$ and $j\alpha_{n+i}$ in a single IFFT operation. Each $\alpha_n$ is simultaneously supplied in an initial OFDM symbol period, and each $\alpha_{n+i}$ is simultaneously supplied in a subsequent OFDM symbol period.

Additional details of the above-described method, systems for using frequency domain spreading to generate real signals in the time domain, and variations of these systems and methods are presented below.

DETAILED DESCRIPTION

Figure 1:
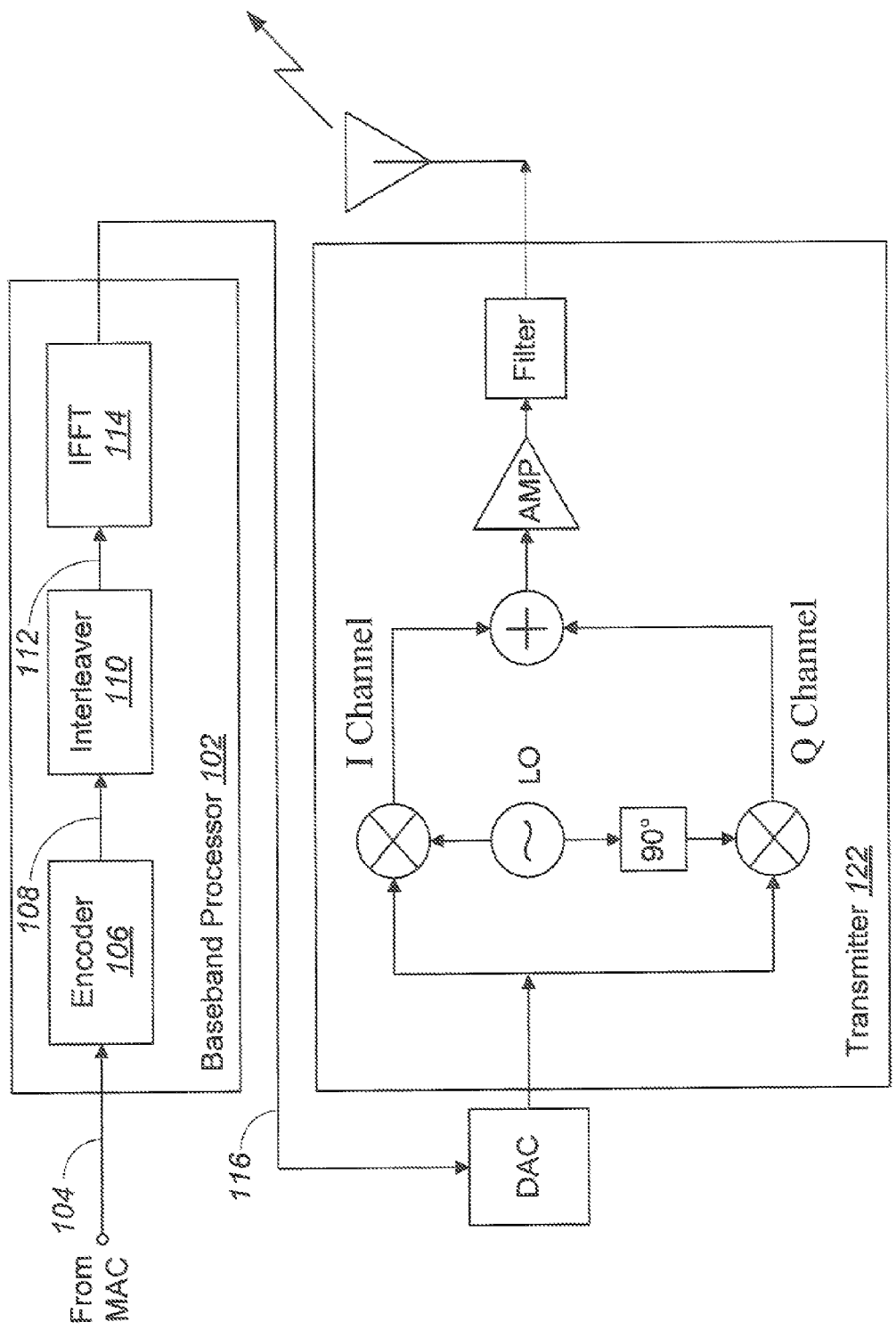
FIG. 1 is a schematic block diagram of a conventional QPSK modulation transmitter (prior art).

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, generation, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 2:
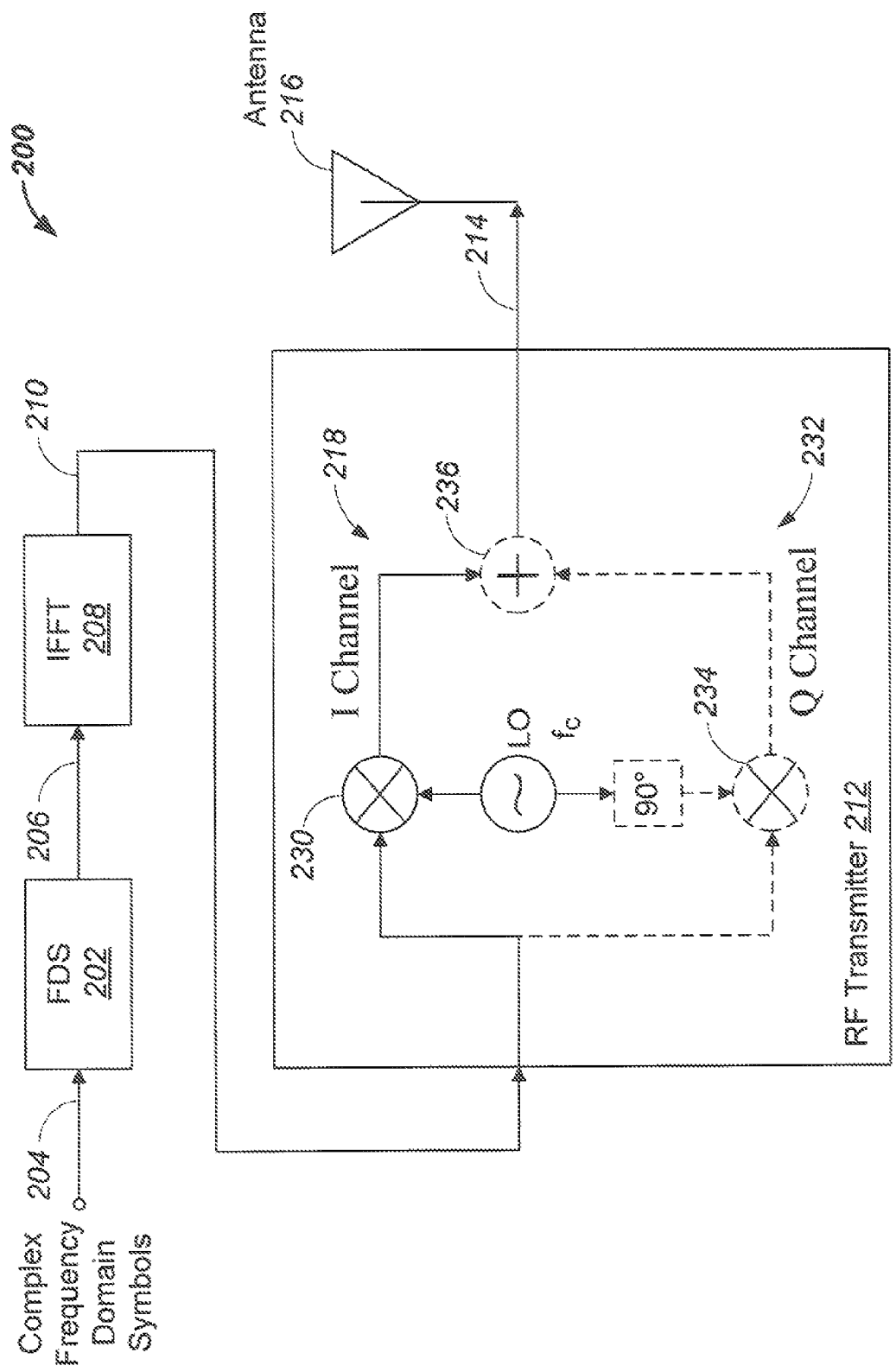
FIG. 2 is a schematic block diagram of frequency domain spreading system for the generation of real signals in the time domain.

FIG. 2 is a schematic block diagram of frequency domain spreading system for the generation of real signals in the time domain. The system 200 comprises a frequency domain spreader (FDS) or FDS means 202 having an input on line 204 to accept a first complex frequency domain symbol ($\alpha$) and a second complex frequency domain symbol ($\alpha_i$). Briefly referencing FIG. 1, the complex frequency domain signal may be supplied from an interleaver, for example. Returning to FIG. 2, the FDS 202 maps ($\alpha+j\alpha_i$) onto a subcarrier (+f) and ($\alpha-j\alpha_i$)* onto a mirror subcarrier (−f), and supplies the mappings at an output on line 206. Alternately stated, the FDS 202 supplies subcarriers with complex symbols mapped to the subcarriers.

An inverse fast Fourier transformer (IFFT) or IFFT means 208 has an input connected to the FDS output on line 206. The IFFT 208 converts the mappings into a complex time domain symbol carrying $\alpha$ and $j\alpha_i$ in single IFFT operation, supplied at an output on line 210. Each IFFT operation is performed within the span of 1 symbol period. The system 200 saves power because the IFFT 208 need only run once every other symbol period. This savings is a result of packing the conversion of two symbols into one symbol period. A radio frequency (RF) transmitter, RF transmission means, or modulation device 212 has an input connected to the IFFT output on line 210. The RF transmitter 212 has an output on line 214 to initially supply a real component of the complex time domain signal carrying $\alpha$, and subsequently supply an imaginary component of the complex time domain signal carrying $\alpha_i$. As shown, line 214 is connected to an antenna 216, to communicate via an air or vacuum media. However, it should be understood that the invention is applicable to any carrier frequency or communication medium (e.g., wireless, wired, optical) capable of carrying modulated information.

Figure 3A:
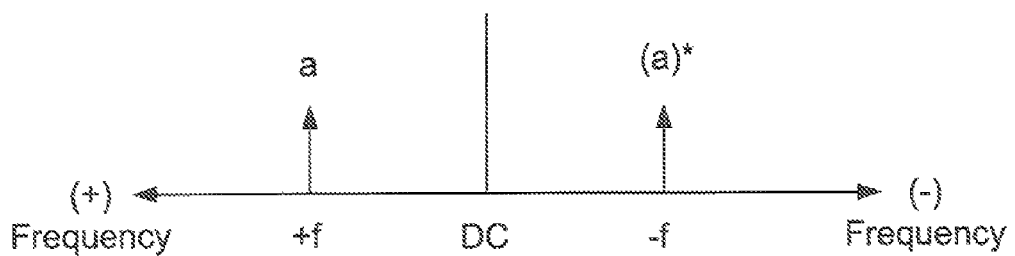
FIGS. 3A and 3B are diagrams depicting supplied signals from the system of FIG. 2 in the frequency domain.
Figure 3B:
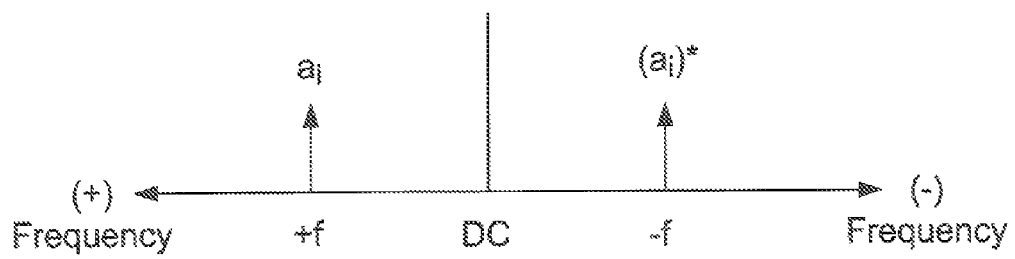

FIGS. 3A and 3B are diagrams depicting supplied signals from the system of FIG. 2 in the frequency domain. In FIG. 3A, the RF transmitter supplies the real symbol components as the subcarrier (+f) carrying $\alpha$ and the mirror subcarrier (−f) carrying $(\alpha)^*$. In FIG. 3B, the RF transmitter supplies the imaginary symbol components as the subcarrier (+f) carrying $\alpha_i$ and the mirror subcarrier (−f) carrying $(\alpha_i)^*$. That is, the RF transmitter supplies a frequency spread real component of the complex time domain symbol ($\alpha$) in FIG. 3A, and a frequency spread imaginary component of the complex time domain symbol ($\alpha_i$) in FIG. 3B. In one aspect, as explained in more detail below, the RF transmitter repeats the supply of $\alpha$ and $\alpha_i$, spreading the complex time domain signal in the time domain.

In another aspect, as explained in greater detail below, the RF transmitter supplies $\alpha$ and $\alpha_i$ as information represented on a real axis of a complex time domain plane, but not as information represented on an imaginary axis of the complex time domain plane. Returning to FIG. 2, the RF transmitter 212 includes an in-phase (I) channel 218 having an input connected to the IFFT output on line 210, and an output to supply $\alpha$ and $\alpha_i$ as complex time domain signals. Alternately (shown in phantom), the RF transmitter may additional include a Q channel as in FIG. 1, which is selectively disengaged. I path information on line 210 is upconverted at mixer 230 with carrier fc. When a Q channel 232 is used, Q path information is upconverted with a phase shifted version of the carrier (fc+90°) at mixer 234. The I path 218 and Q path would be summed at a combiner 236. The combiner is not necessary if there is no Q channel.

Figure 4A:
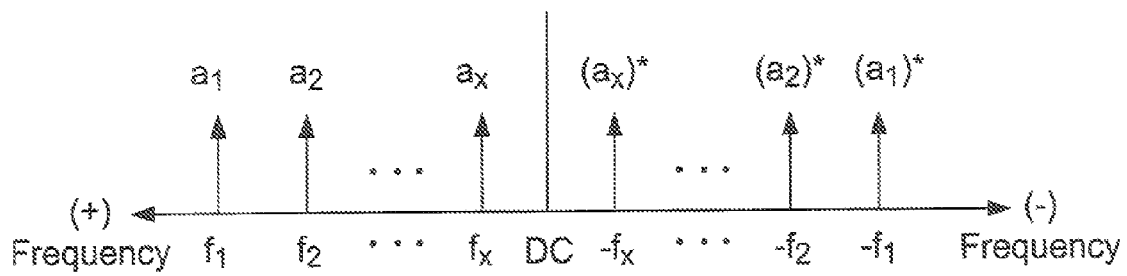
FIGS. 4A and 4B are frequency domain diagrams depicting a system using a plurality of subcarriers.
Figure 4B:
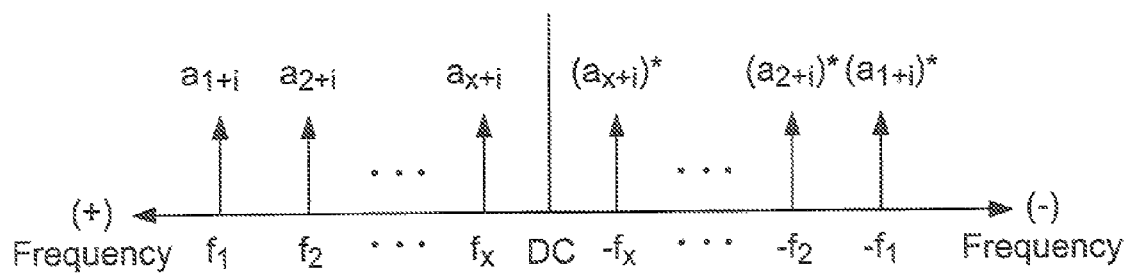

FIGS. 4A and 4B are frequency domain diagrams depicting a system using a plurality of subcarriers. Contrasting FIGS. 2 and 4A-4B, in this aspect the FDS 202 accepts a plurality of first complex frequency domain symbols ($\alpha_n$) paired with a plurality of second complex frequency domain symbol ($\alpha_{n+i}$). The FDS 202 maps each ($\alpha_n + j\alpha_{n+i}$) pair onto a subcarrier (+$f_n$), and maps each ($\alpha_n - j\alpha_{n+i}$)* pair onto a mirror subcarrier (−$f_n$). Note: n is a variable and i is a constant, which are not limited to any particular values. In the figures, the maximum value of n=x. The IFFT 208 converts the mappings into a complex time domain signal carrying $\alpha_n$ and $j\alpha_{n+i}$ in a single IFFT operation. The RF transmitter 212 simultaneously supplies each $\alpha_n$ in an initial symbol period, and simultaneously supplies each $\alpha_{n+i}$ in a subsequent symbol period. In one aspect, x=2i. For example, x may be 100 and i=50.

In another aspect, the system incorporates more conventional time domain spreading into the above-described FDS method. That is, the RF transmitter 212 repeats the supply of each $\alpha_n$ in a symbol period following the initial symbol period, and repeats the supply of each $\alpha_{n+i}$ in a symbol period following the subsequent symbol period. For example, the RF transmitter 212 supplies $\alpha_n$ in a first symbol period, and repeats the supply of $\alpha_n$ in a second symbol period immediately following the first symbol period. Such a system of combined TDS and FDS may be used to supply an ultra-wideband (UWB) signal with a data rate in the range of 80 to 200 megabits per second (Mps).

Figure 5:
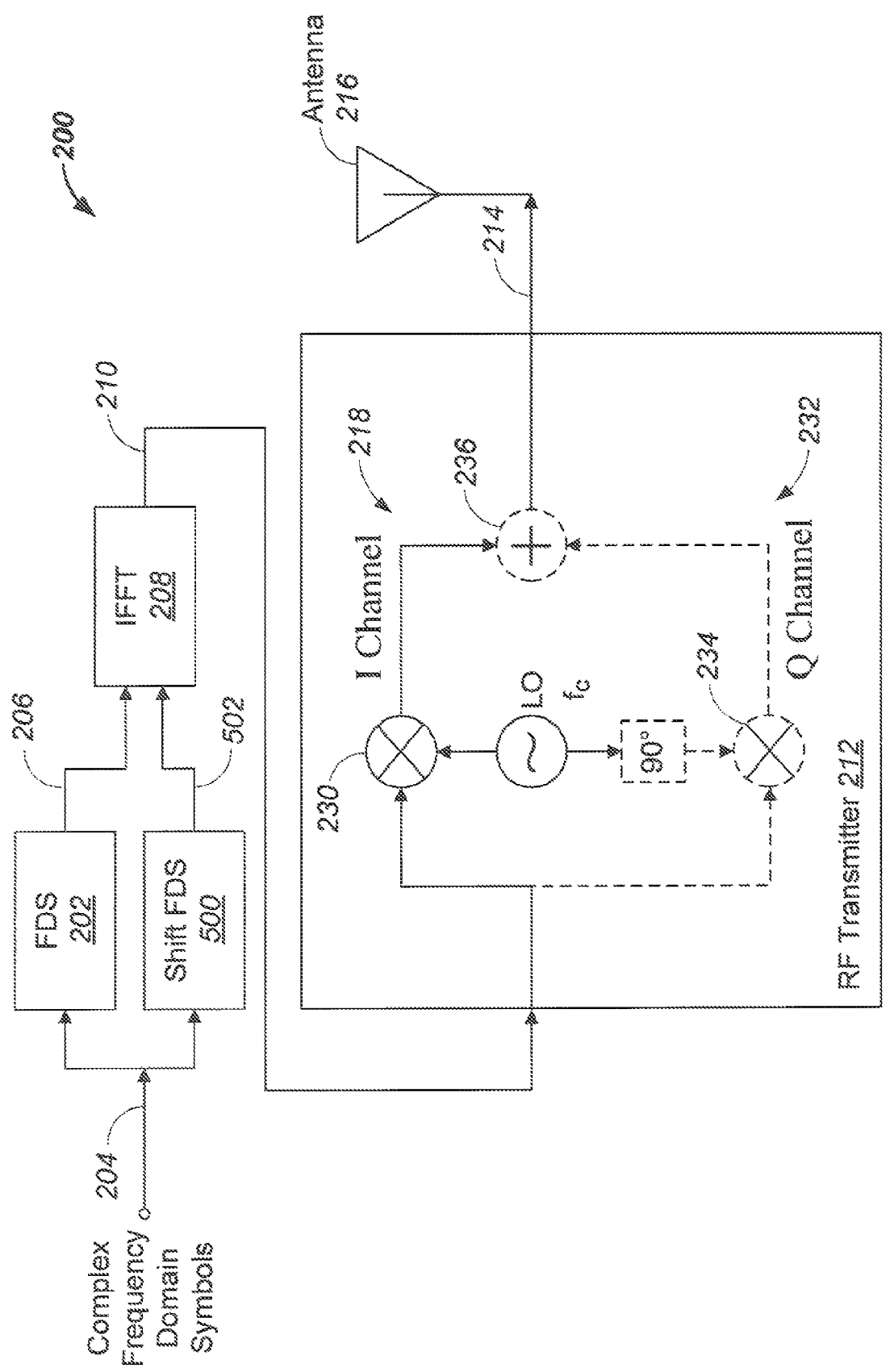
FIG. 5 is a schematic block diagram depicting a variation of the system presented in FIG. 2.

FIG. 5 is a schematic block diagram depicting a variation of the system presented in FIG. 2. This variation offers an extra degree of frequency diversity at the cost of additional IFFT processing. A shift FDS 500 has an input on line 204 to accept the plurality of first complex frequency domain symbols ($\alpha_n$) paired with the plurality of second complex frequency domain symbol ($\alpha_{n+i}$). The shift FDS 500 maps each ($\alpha_n + j\alpha_{n+i}$) pair onto a shifted subcarrier (+$f_{n+k}$), and maps each ($\alpha_n - j\alpha_{n+i}$)* pair onto a shifted mirror subcarrier (−$f_{n+k}$). The mappings are supplied at an output on line 502.

The IFFT 208 input is connected to the shift FDS output on line 502. The IFFT 208 converts the subcarrier (+$f_n$) and mirror subcarrier (−$f_n$) mappings into a complex time domain symbol in a first IFFT operation, as described above in the explanation of FIG. 2. The IFFT 208 converts the shifted subcarrier (+$f_{n+k}$) and shifted mirror subcarrier (−$f_{n+k}$) mappings into complex time domain signal carrying $\alpha_n$ and $j\alpha_{n+i}$ in a second IFFT operation.

Figure 6A:
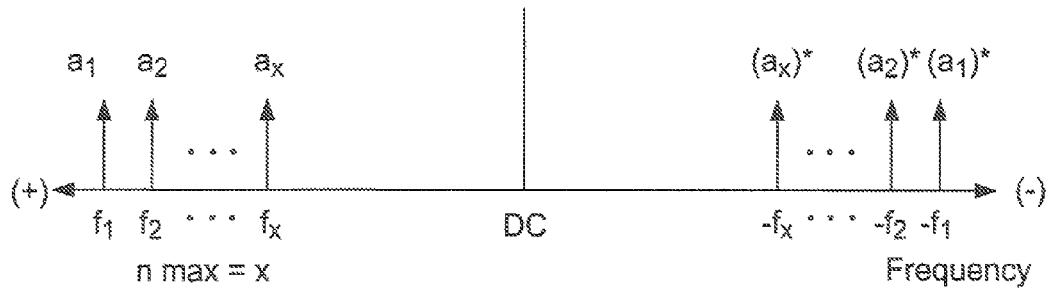
FIGS. 6A through 6D are frequency domain diagrams depicting a system using a plurality of shifted subcarriers.
Figure 6B:
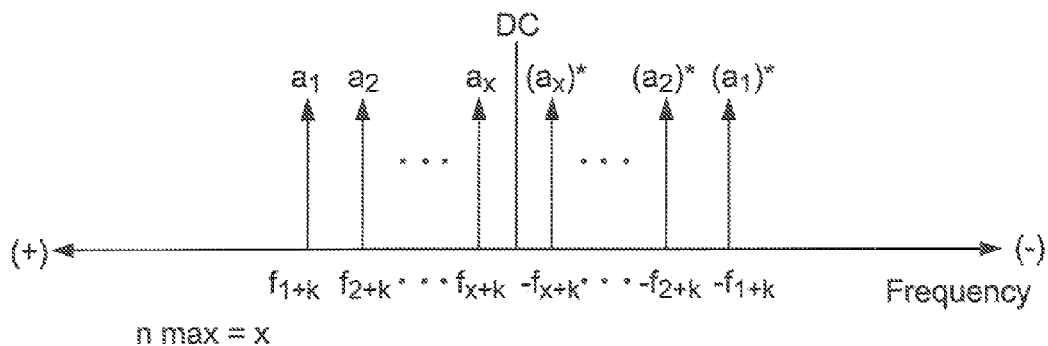
Figure 6C:
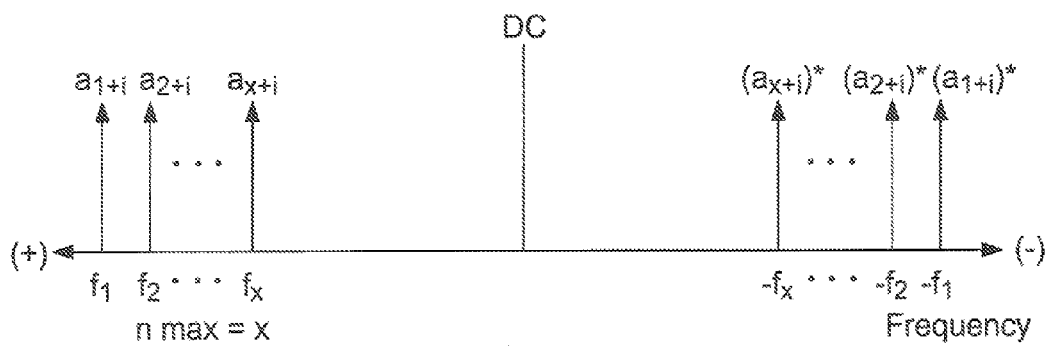
Figure 6D:
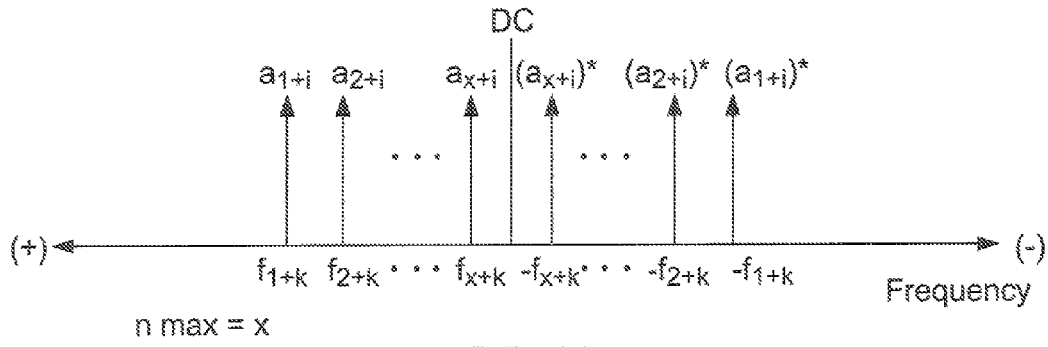

FIGS. 6A through 6D are frequency domain diagrams depicting a system using a plurality of shifted subcarriers. Contrasting FIGS. 6A-6D with FIG. 5, the RF transmitter 212 supplies each $\alpha_n$ on the subcarriers (+$f_n$) and mirror subcarriers (−$f_n$) in the initial symbol period (FIG. 6A), and simultaneously supplies each $\alpha_n$ on the shifted subcarriers (+$f_{n+k}$) and shifted mirror subcarriers (−$f_{n+k}$) in a symbol period following the initial symbol period (FIG. 6B). In the figures, i and k are constants, and n is a variable with a maximum value=x. The RF transmitter 212 supplies each $\alpha_{n+i}$ on the subcarriers (+$f_n$) and mirror subcarriers (−$f_n$) in the subsequent symbol period (FIG. 6C), and simultaneously supplies each $\alpha_{n+i}$ on the shifted subcarriers (+$f_{n+k}$) and shifted mirror subcarriers (−$f_{n+k}$) in a symbol period following the subsequent symbol period (FIG. 6D).

The system of FIG. 5 may also be enabled to incorporate more conventional aspects of TDS. For example, the RF transmitter 212 may repeat the supply of each $\alpha_n$ on the subcarriers (+$f_n$) and mirror subcarriers (−$f_n$), and repeat the supply of each $\alpha_{n+i}$ on the subcarriers (+$f_n$) and mirror subcarriers (−$f_n$). Likewise, the RF transmitter 212 repeats the supply of each $\alpha_n$ on the shifted subcarriers (+$f_{n+k}$) and shifted mirror subcarriers (−$f_{n+k}$), and repeats the supply of each $\alpha_{n+i}$ on the shifted subcarriers (+$f_{n+k}$) and shifted mirror subcarriers (−$f_{n+k}$). For example, the RF transmitter 212 may supply a UWB signal with a data rate of 80 megabits per second (Mps), or less.

Although not specifically depicted, the system of FIG. 2 may be enabled as a processing device using FDS to generate real signals in the time domain. The processing device comprises a FDS module having an input to accept a first complex frequency domain symbol ($\alpha$) and a second complex frequency domain symbol ($\alpha_i$). The FDS module maps ($\alpha + j\alpha_i$) onto a subcarrier (+f) and ($\alpha - j\alpha_i$)* onto a mirror subcarrier (−f), and supplies the mappings at an output. The processor includes an IFFT module having an input connected to the FDS module output. The IFFT module converts the mappings into a complex time domain symbol carrying $\alpha$ and $j\alpha_i$ in single IFFT operation, supplied at an output. The processing device also includes a RF transmission module having an input connected to the IFFT module output. The RF transmission module has an output to initially supply a real component of the complex time domain signal carrying $\alpha$ and subsequently supply an imaginary component of the complex time domain signal carrying $\alpha_i$.

Functional Description

WiMedia UWB is a high data rate OFDM system for Wireless Personal Area Networks. The design philosophy is a mixture of high throughput and low power consumption. The standard uses special time and frequency domain spreadings to enable low power consumption for the lower data rates and for low-end devices. However, conventional spreading may result in a loss of channel diversity in certain scenarios. The above-described system is an efficient frequency domain spreading scheme implemented in the time domain. Other spreading schemes can be added to this foundation, either to enhance diversity loss or to achieve additional power and hardware savings for low-end devices.

WiMedia UWB is an OFDM system designed to deliver data rates between 53.3 and 480 Mbps in pico-environments, such as Personal Area Networks (PAN). Low power consumption is essential to support a variety of PAN applications, especially if the modem is located in a mobile phone. Low power consumption is mainly achieved by duty cycling. Nevertheless, very high data rates require complex VLSI chips running at very high clock rates. In order to reduce power consumption when running at lower data rates, and to allow for low-end devices (up to 200 Mbps), the designers opted for special schemes such as time and frequency spreading (repetition) that reduce the clock rate at which the FFT and various components need to execute. These repetition schemes are suboptimal, trading performance for cost and power consumption.

At the transmitter side, FDS can be implemented in the time domain in a manner that makes pure TDS impractical. The advantages of TDS and FDS can be combined into more powerful spreading designs, to achieve higher diversity gains, or to further simplify the hardware and reduce cost.

Figure 7A:
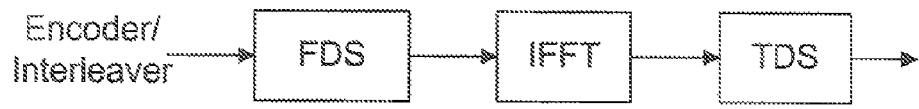
FIGS. 7A through 7D are WiMedia UWB transmitter block diagrams depicting the use of FDS and TDS spreading.
Figure 7B:
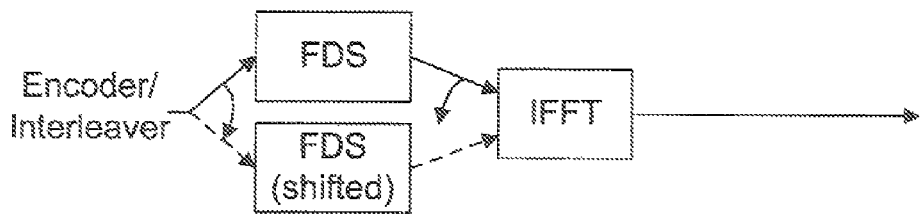
Figure 7C:
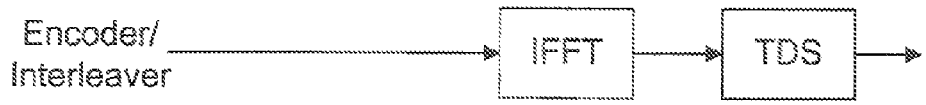
Figure 7D:
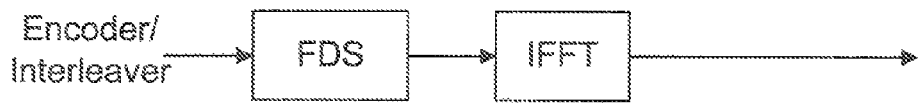

FIGS. 7A through 7D are WiMedia UWB transmitter block diagrams depicting the use of FDS and TDS spreading. FIG. 7A shows the current standard for lower data rates up to 80 Mbps. FIG. 7B shows of the system depicted in FIG. 7A, with better diversity, and where FDS can be efficiently performed in time domain. FIG. 7C shows the current standard for medium data rates up to 200 Mbps. FIG. 7D shows a variation of the system of FIG. 7C that produces a real-only signal in the time domain, which eliminates the need for a Q channel in the transmitter of low-end devices (up to 200 Mbps).

WiMedia is a multi-band hopping OFDM system. Each OFDM symbol spans a bandwidth of about 500 MHz, and can be transmitted on a different frequency band, for up to 3 bands (a total of 1.5 GHz). Band hopping offers better diversity and permits higher power transmission. If the device is band hopping over 3 bands, it is permitted to transmit 3 times more power. Nevertheless, band hopping can be turned off in some cases for various reasons, for example, the unavailability of spectrum or excessive interference on certain bands.

An OFDM symbol in the WiMedia standard consists of a total of 128 subcarriers placed at 4.125 MHz intervals. The center subcarrier is located at (relative) frequency 0 and is called DC carrier. This subcarrier is unused. At each band edge are 2.5 null subcarriers and 5 guard subcarriers. These subcarriers are typically unused and help in spectrum shaping. Of the remaining 112 subcarriers, 100 are data tones, and 12 are pilot tones uniformly distributed between the data tones.

The subcarriers carry a QPSK constellation for data rates up to 200 Mbps, and a Dual Coded Modulation (DCM) for higher data rates. DCM provides more diversity for high data rates. Signal spreading is typically only applied to data rates up to 200 Mbps. Using QPSK, each data tone (subcarrier) can carry 2 (coded) data bits. Since there are 100 tones reserved for data, 200 data bits may be carried per OFDM symbol. QPSK symbols are represented as complex signals in the frequency domain, and are typically complex signals in the time domain. A complex time domain signal is conveyed by the in-phase (I) and quadrature-phase (Q) channels.

In order to reduce power consumption, WiMedia's FDS is a form of repetition in the frequency domain that produces a real-only signal in the time domain. Hence, only the I channel carries a signal and the Q channel can be turned off. Note: that this relationship is only true at the transmitter side. At the receiver side, the radio channel can rotate the signal and both I and Q channels are needed for proper decoding.

Figure 8:
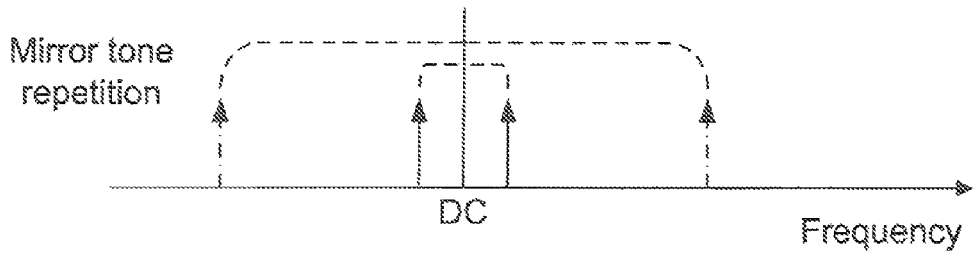
FIG. 8 is a diagram depicting the use of FDS to repeat information as a complex conjugate at a mirror frequency.

FIG. 8 is a diagram depicting the use of FDS to repeat information as a complex conjugate at a mirror frequency. As shown, FDS maps data onto the positive frequency subcarriers, and then repeats that same data on the mirror negative subcarriers (or vice versa). The complex conjugate version is actually repeated such that the time domain signal is a real-only signal.

In terms of number of (coded) data bits, every 100 bits are grouped together and mapped to the 50 positive frequency data tones. In some aspect, FDS is only used by the lower data rates up to 80 Mbps. The main advantage of this form of FDS is power saving, since the Q channel is turned off. Another advantage to any form of spreading is that all blocks before the spreader (e.g., the interleaver, puncturer, etc.) run at a lower clock speed (half speed, in this case). This savings is important in UWB where high data rates require very high clock rates.

There are, however, some disadvantages associated with spreading. Mainly, a loss of diversity may result near the DC subcarrier, as the repeated mirror subcarrier is very near to the (positive) subcarrier, and both frequencies may fade simultaneously. Another minor disadvantage is that the resulting real-only signal in the time domain tends to have higher peak-to-average ratio.

In order to reduce the speed of the IFFT at the transmitter side, thereby reducing power consumption, TDS is used. One form of TDS is merely the repetition of the same OFDM symbol in time domain, plus scrambling to maintain good spectral properties. Another form of TDS is a repetition, plus scrambling, plus I/Q swapping. I/Q swapping in the time domain results in repetition on the mirror subcarriers in frequency domain. This method is useful in preventing the repetition of data at the same frequency, which can fade simultaneously.

Figure 9:
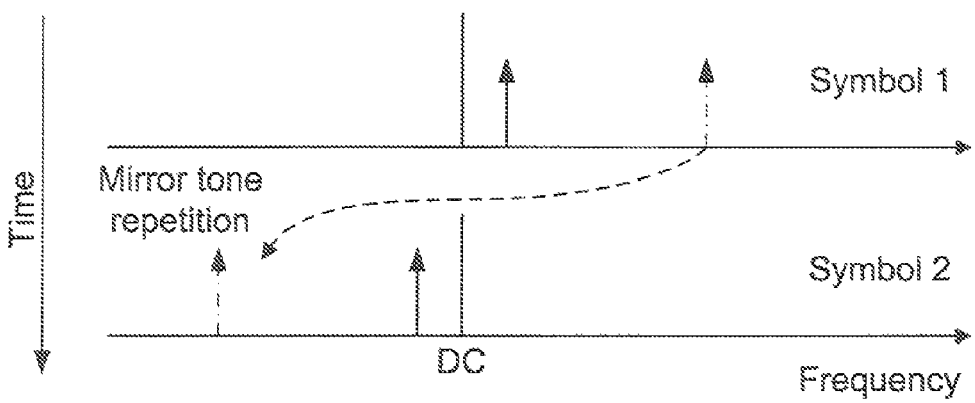
FIG. 9 is a diagram depicting an example of time domain spreading, where I/Q swapping is performed in time domain, and the repetition occurs at mirror frequency.

FIG. 9 is a diagram depicting an example of time domain spreading, where I/Q swapping is performed in time domain, and the repetition occurs at mirror frequency. The second OFDM symbol, although it is repeated, has mirrored frequency tones due to swapped I/Q. TDS is generally considered useful for low and medium data rates up to 200 Mbps. For data rates up to 80 Mbps, I/Q swapping is often unnecessary. For data rates above that and up to 200 Mbps, I/Q swapping is performed.

As mentioned for FDS, an advantage to any form of spreading is that all blocks before the spreader, such as the interleaver or puncturer, may be run at a lower clock speed. In the case of time spreading, the IFFT block occurs before the spreader, and hence this engine runs at half the rate by repeating an OFDM symbol in time domain. That is, an IFFT need not be executed for this repeated symbol. This savings is important in UWB where high data rates require very high clock rates. The disadvantage is that some loss of diversity may occur, in a manner similar to FDS, as described above.

It is well known that TDS can be performed in the frequency domain. This is a necessary operation at the receiver side when a repeated symbol is transmitted through different channels. The above-described system of FIG. 2 takes advantage of this relationship to perform FDS in the time domain. One advantage to TDS is that it permits the IFFT engine to be run at half speed. By performing FDS in the time domain, the IFFT engine can be run at a quarter speed, or enabled at half-speed with more robust spreading schemes.

The system described in FIG. 2 uses a conventional FDS design, but the spreading is performed more efficiently. Conventionally when using FDS, the IFFT engine is under-used since half of the spectrum is a mirror repetition of the other half. However, there is a way to perform 2 such IFFTs simultaneously, thereby producing 2 consecutive OFDM symbols in one shot. In other words, twice as many bits are packed into one OFDM symbol before the IFFT (without mirroring). A single IFFT is executed to produce a complex time domain signal, rather than a real-only signal. The real part of this complex signal is the usual first OFDM symbol, and the imaginary part is the usual second OFDM symbol (transmitted on the I channel). Essentially, the system uses the IFFT engine more efficiently. This form of spreading operation may be seen as a time domain spreading since a complex symbol is repeated in the time domain, once by transmitting its real part and another time by transmitting its imaginary part.

The following is a more detailed description of the FDS in time domain operation:

1) After the interleaver, every 200 bits are grouped together, rather than grouping just 100 bits as with conventional FDS.

2) Every 2 consecutive bits are mapped to QPSK as is conventional. The result is 100 complex data symbols $a_n$ (rather than 50).

3) The complex data symbols are grouped in pairs $(a_n, a_{n+50})$. Each pair consists of 4 coded data bits.

4) Each pair is assigned the usual corresponding pair of tones $(+f_n, -f_n)$.

5) The sum $a_n + ja_{n+50}$ is mapped onto tone $+f_n$.

6) The difference $(a_n - ja_{n+50})^*$ is mapped onto tone $-f_n$.

7) IFFT is performed to obtain a complex time domain signal $x_k$.

8) In the first OFDM symbol, transmit $\Re\, x_k$.

9) In the second OFDM symbol, transmit $\Im\, x_k$.

Remembering that $U+U^* = 2\,\text{Re}\,U$, the output of the IFFT for the pair $(a_n, a_{n+50})$ is:

$$x_k^{(n)} = (a_n + ja_{n+50})e^{j2\pi fk} + (a_n - ja_{n+50})^* e^{-j2\pi fk} \quad (1)$$
$$= \text{Re}\,2a_n e^{j2\pi fk} + j\text{Re}\,2a_{n+50} e^{j2\pi fk}.$$

When using FDS, the first (real) part of (1) is precisely what is transmitted in the first OFDM symbol in time domain, and the second (imaginary) part is transmitted in the second OFDM symbol (as a real signal).

The complex additions $a_n \pm ja_{n+50}$ are very simple operations involving additions of signed 1 bit quantities. They can be performed by using a simple look up table, in conjunction with QPSK mapping. There is an issue, however, with the interleaver block size. When using FDS, the interleaver block size is 300 bits. It is difficult to group every 200 bits together without extra work. Two possible solutions are to either run the IFFT only 1.5 times slower (once for 200 bits and once for 100 bits), or to wait for the missing 100 bits from the next interleaving period before invoking the IFFT. Pilot tones are handled exactly like data tones. Group every 2 pilot tones into a pair, combine them as mentioned for data, and map the pair on the 2 corresponding mirror frequencies.

Other than running the IFFT engine at ¼th speed, the ability to perform FDS efficiently in time domain opens up new possibilities. Improvements can be enabled that use FDS in place of TDS. Additions and perhaps modifications to the standard are needed for these improvements.

In one aspect, more diversity may be obtained at lower data rates. Data rates 53.3 and 80 Mbps use two cascaded spreading stages, FDS and TDS. Significant loss of diversity is observed for these data rates in the absence of frequency band hopping. This loss of diversity is due to the fact that FDS and TDS are suboptimal and don't interact well when combined without band hopping. Tones are repeated twice in the same place (frequency) and certain tones are repeated 4 times in the same place (near DC).

Improvement can be achieved by replacing TDS with a second FDS, as shown on FIG. 7B. The second FDS is multiplexed rather than cascaded. The usual first FDS uses half the spectrum and repeats tones in a mirror fashion. The second FDS does the same, after shifting (with wrap around) the tones by a quarter spectrum. Hence, the distance between repeated tones from the first and second FDS is a quarter spectrum.

Up to 1 dB gain can be achieved with this scheme. Due to multiplexed rather than cascaded FDS blocks, the IFFT engine cannot run four times slower, but only twice as slow. Scrambling can be applied to maintain good spectral properties, if needed.

In another aspect, a low-end UWB transmitter may be enabled without a Q Channel. Low-end UWB devices for data rates up to 200 Mbps can benefit by replacing TDS with FDS, as shown in FIG. 7D, in order to produce a real-only signal in time domain. Conventionally, the signal is complex for data rates above 80 Mbps. There is no need for a Q channel in the transmitter of such low-end devices. This is a significant saving of hardware and power. For example, without a Q channel, a transmitter can be built with one less digital-to-analog converter (DAC), one less mixer, and with fewer filters. Moreover, the IQ imbalance constraints can be significantly relaxed when the signals are real-only.

Figure 10:
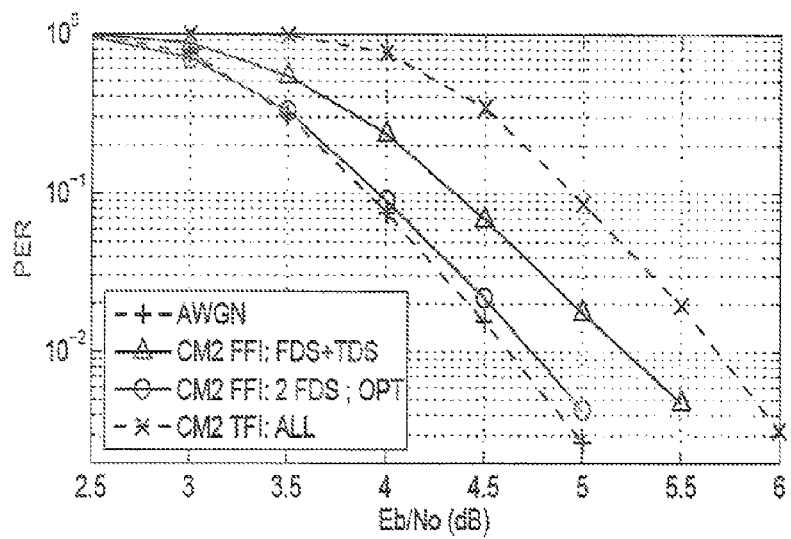
FIGS. 10 through 12 depict simulations for the above-described system at data rates of 53.3, 80 and 200 Mbps in AWGN, and in an IEEE 802.15.3's channel model CM2 (indoor pico-environment of about 4 meters).
Figure 11:
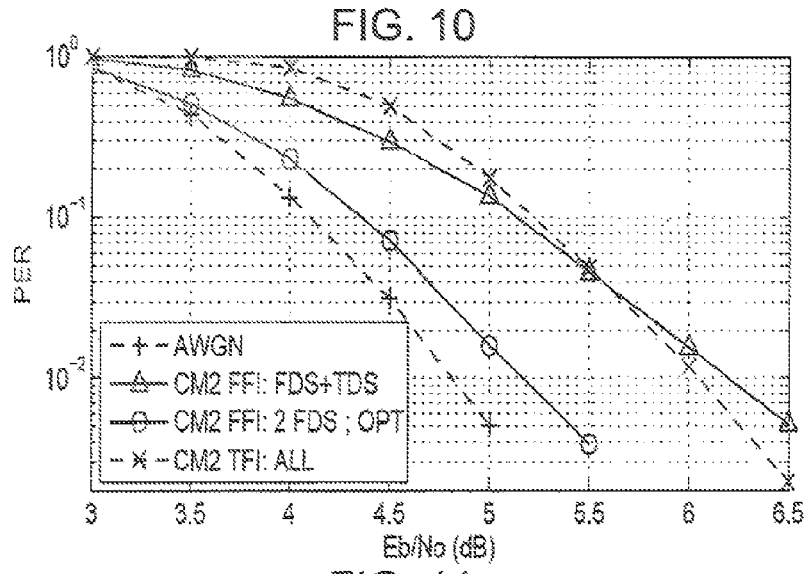
Figure 12:
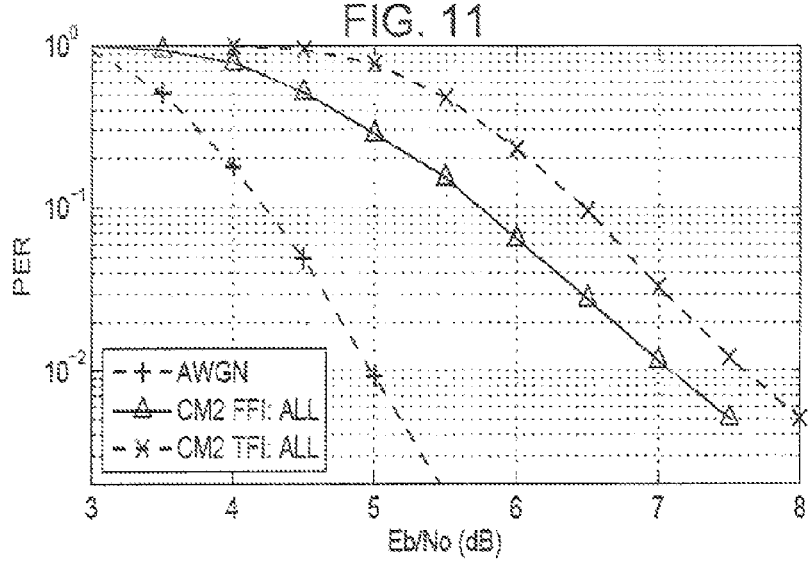

FIGS. 10 through 12 depict simulations for the above-described system at data rates of 53.3, 80 and 200 Mbps in AWGN, and in an IEEE 802.15.3's channel model CM2 (indoor pico-environment of about 4 meters). Shadowing is turned off. Graphs for both Fixed Frequency Interleaving (FFI, i.e., frequency band hopping disabled) and Time Frequency Interleaving (TFI, i.e., frequency band hopping enabled and using 3 bands) are obtained. The various figures show the Packet Error Rate (PER) as a function of Eb/No.

In order to assess how well a spreading scheme is performing, an optimum spreading scheme has been simulated for reference. In this scheme an OFDM symbol is repeated in the frequency domain, and shifts of one-half or one-quarter spectrum are applied to the repeated symbols. The resulting time domain signal is complex, and the IFFT runs at full speed. Although denoted as optimal spreading, this is not the optimal form of repetition. An optimal repetition is a repeater block inserted before the puncturer (transmitter side) which provides not only diversity gain, but also coding gain. The overall hardware costs of this approach are more expensive however.

The results for the data rate of 53.3 Mbps are shown in FIG. 10. Results for the data rate of 80 Mbps in FIG. 11, and results for the data rate of 200 Mbps are shown in FIG. 12. For clarity, where two curves are nearly overlapping, they have been merged. The nomenclature in the legends is explained in Table 1.

TABLE 1

Nomenclature

| Initials | Description |
| --- | --- |
| FDS + TDS | Current standard (lower data rates) |
| 2 FDS | 2 Multiplexed FDS (lower data rates) |
| OPT | Optimal spreading |
| ALL | All curves are identical (merged) |

First, it may be noted that performance in FFI mode (no band hopping) is better than TFI mode (frequency band hopping). The reason for this difference is simple and due to channel estimation error. The training sequence consists of a total of 6 OFDM symbols. In FFI mode, all 6 symbols are dedicated to a unique frequency band. In TFI mode, every 2 symbols are assigned to one frequency band. However, since in TFI mode the UWB device is allowed to transmit 3 times more power, this difference in performance does not exist in practical systems. The power constraint on FFI mode limits its capability. Hence, the two modes cannot be directly compared on these graphs.

As far as diversity is concerned, the results show that in the TFI mode, optimal spreading and suboptimal spreading are identical: no diversity gain is achievable. But in the FFI mode, significant diversity gain can be achieved for lower data rates using the scheme with 2 multiplexed FDS'. This scheme is as good as optimal spreading. The diversity gains achieved in FFI mode are listed in Table 2. For the data rate of 200 Mbps, all schemes perform equally well. In particular, the replacement of TDS by FDS does not result in any loss of diversity.

TABLE 2

Diversity gain in FFI mode at PER of 1%

| Data Rate | Diversity Gain |
| --- | --- |
| 53.3 Mbps | 0.5 dB |
| 80 Mbps | 1 dB |
| 200 Mbps | No gain, no loss |

Thus, FDS can be implemented in the time domain at the transmitter side by producing one complex symbol in time domain, and then separately transmitting its real part, followed by its imaginary part. This enables several options for enhanced spreading methods, where enhancements range from increased diversity gains to reduced cost and hardware. For lower data rates up to 80 Mbps: 2 multiplexed FDS' may be used with a shifted spectrum. Essentially, the cascaded TDS block is replaced by the second multiplexed FDS. Diversity gains of up to 1 dB are achieved in certain cases. For medium data rates up to 200 Mbps, a unique FDS replaces the TDS block. The resulting time domain signal is a real-only signal and low-end devices using this scheme do not need a Q channel in the transmitter. DAC, mixer and other components on this chain are unnecessary.

In essence, time domain spreading has been replaced by frequency domain spreading exclusively. The operation of separating the real and imaginary components in the time domain normally generates ISI at the receiver side after the signal has gone through different channels. But the pre-combination of the symbols prior to the IFFT acts like a pre-equalization that cancels this ISI.

Figure 13:
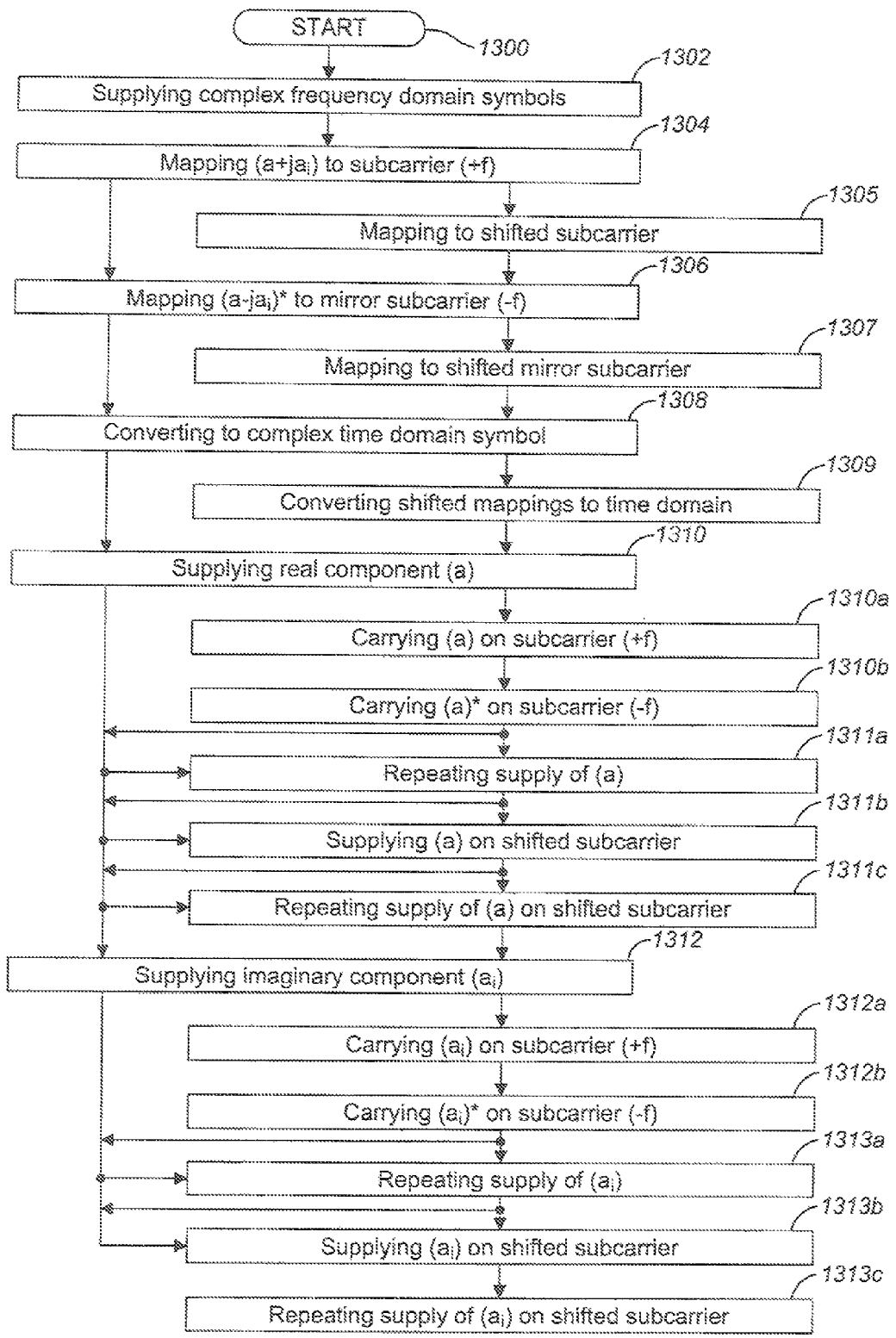
FIG. 13 is a flowchart illustrating a method for using frequency domain spreading to generate real signals in the time domain.

FIG. 13 is a flowchart illustrating a method for using frequency domain spreading to generate real signals in the time domain. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1300.

Step 1302 supplies a first complex frequency domain symbol ($\alpha$) and a second complex frequency domain symbol ($\alpha_i$). Step 1304 maps ($\alpha+j\alpha_i$) onto a subcarrier (+f). Step 1306 maps ($\alpha-j\alpha_i$)* onto a mirror subcarrier (−f). Step 1308 converts the mappings into a complex time domain symbol carrying $\alpha$ and $j\alpha_i$ in a single inverse fast Fourier transformation (IFFT). Step 1310 supplies a real component of the complex time domain symbol ($\alpha$), and Step 1312 subsequently supplies an imaginary component of the complex time domain symbol ($\alpha_i$). Supplying a real component of the complex time domain symbol ($\alpha$) in Step 1310 includes supplying a frequency spread real component. Supplying an imaginary component of the complex time domain symbol ($\alpha_i$) in Step 1312 includes supplying a frequency spread imaginary component. Alternately considered, Steps 1310 and 1312 supply $\alpha$ and $\alpha_i$ in a manner that spreads the complex time domain signal in the time domain.

In one aspect, supplying $\alpha$ in Step 1310 includes supplying the real symbol components as follows. Step 1310a carries $\alpha$ on the subcarrier (+f) and Step 1310b carries ($\alpha$)* on the mirror subcarrier (−f). Likewise, supplying $\alpha_i$ in Step 1312 includes supplying the imaginary symbol components as follows. Step 1312a carries $\alpha_i$ on the subcarrier (+f). Step 1312b carries ($\alpha_i$)* on the mirror subcarrier (−f). That is, supplying $\alpha$ and $\alpha_i$ in Step 1310 and 1312 includes supplying symbols including information represented on a real axis of a complex time domain plane, but no information represented on an imaginary axis of the complex time domain plane. Expressed another way, Step 1310 and 1312 supply the complex time domain signals exclusively via an in-phase (I) channel.

In another aspect, supplying the first and second complex frequency domain symbols in Step 1302 includes supplying a plurality of first complex frequency domain symbols ($\alpha_n$) paired with a plurality of second complex frequency domain symbol ($\alpha_{n+i}$). Then, mapping $\alpha+\alpha_i$ onto the subcarrier +f in Step 1304 includes mapping each ($\alpha_n+j\alpha_{n+i}$) pair onto a subcarrier (+$f_n$), and mapping ($\alpha-j\alpha_i$)* onto the subcarrier −f in Step 1306 includes mapping each ($\alpha_n-j\alpha_{n+i}$)* pair onto a mirror subcarrier (−$f_n$). Step 1308 converts the mappings into a complex time domain signal carrying $\alpha_n$ and $j\alpha_{n+i}$ in a single IFFT operation. Step 1310 simultaneously supplies each $\alpha_n$, Step 1312 simultaneously supplies each $\alpha_{n+i}$.

In one variation, Step 1311a repeats the simultaneous supply of each $\alpha_n$, and Step 1313a repeats the simultaneous supply of each $\alpha_{n+i}$. The combination of Step 1310, 1311a, 1312, and 1313a supply an UWB signal with a data rate in the range of 80 to 200 megabits per second (Mps).

In another variation, Step 1305 maps each ($\alpha_n+j\alpha_{n+i}$) pair onto a shifted subcarrier (+$f_{n+k}$), and Step 1307 maps each ($\alpha_n-j\alpha_{n+i}$)* pair onto a shifted mirror subcarrier (−$f_{n+k}$). Subsequent to converting the subcarrier (+$f_n$) and mirror subcarrier (−$f_n$) mappings into a complex time domain symbol in Step 1308, Step 1309 converts the shifted subcarrier (+$f_{n+k}$) and shifted mirror subcarrier (−$f_{n+k}$) mappings into complex time domain signal carrying $\alpha_n$ and $j\alpha_{n+i}$ in a single IFFT.

Step 1311b supplies each $\alpha_n$ on the shifted subcarriers (+$f_{n+k}$) and shifted mirror subcarriers (−$f_{n+k}$), subsequent to supplying each $\alpha_n$ on the subcarriers (+$f_n$) and mirror subcarriers (−$f_n$) in Step 1310. Likewise, Step 1313b supplies each $\alpha_{n+i}$ on the shifted subcarriers (+$f_{n+k}$) and shifted mirror subcarriers (−$f_{n+k}$), subsequent to supplying each $\alpha_{n+i}$ on the subcarriers (+$f_n$) and mirror subcarriers (−$f_n$) in Step 1312.

In one variation, Step 1311*a* repeats the supply of each $\alpha_n$ on the subcarriers ($+f_n$) and mirror subcarriers ($-f_n$), and Step 1311*c* repeats the supply of each $\alpha_{n+i}$ on the subcarriers ($+f_n$) and mirror subcarriers ($-f_n$). Likewise, Step 1313*a* repeats the supply of each $\alpha_n$ on the shifted subcarriers ($+f_{n+k}$) and shifted mirror subcarriers ($-f_{n+k}$), and Step 1313*c* repeats the supply of each $\alpha_{n+i}$ on the shifted subcarriers ($+f_{n+k}$) and shifted mirror subcarriers ($-f_{n+k}$). For example, the combination of Step 1310, 1311*a*, 1311*b*, 1311*c*, 1312, 1313*a*, 1313*b*, and 1313*c* may supply a UWB signal with a data rate of 80 megabits per second (Mps), or less.

The above-described flowchart may also be interpreted as an expression of a machine-readable medium having stored thereon instructions for using frequency domain spreading to supply real signals in the time domain. The instructions for supplying real-only signals would correspond to Steps 1300 through 1313*c*, as explained above.

Systems, methods, devices, and processors have been presented for using frequency domain spreading to generate real signals in the time domain. Examples of UWB communication protocols and formats have been given to illustrate the invention. However, the invention is not limited to merely these examples. Other variations and embodiments of the invention will occur to those skilled in the art.

What is claimed is:

1. A method in a computing device for using frequency domain spreading to generate real signals in the time domain, the method comprising:
    supplying a first complex frequency domain symbol ($\alpha$) and a second complex frequency domain symbol ($\alpha_i$);
    mapping ($\alpha + j\alpha_i$) onto a subcarrier ($+f$);
    mapping ($\alpha - j\alpha_i$)* onto a mirror subcarrier ($-f$);
    converting the mappings into a complex time domain symbol carrying $\alpha$ and $j\alpha_i$ in a single inverse fast Fourier transformation (IFFT);
    supplying a real component of the complex time domain symbol ($\alpha$); and,
    subsequently supplying an imaginary component of the complex time domain symbol ($\alpha_i$).

2. The method of claim 1 wherein supplying $\alpha$ includes supplying the real symbol components as follows:
    carrying $\alpha$ on the subcarrier ($+f$); and,
    carrying ($\alpha$)* on the mirror subcarrier ($-f$); and,
wherein supplying $\alpha_i$ includes supplying the imaginary symbol components as follows:
    carrying $\alpha_i$ on the subcarrier ($+f$); and,
    carrying ($\alpha_i$)* on the mirror subcarrier ($-f$).

3. The method of claim 1 wherein supplying $\alpha$ and $\alpha_i$ includes supplying symbols including information represented on a real axis of a complex time domain plane, but no information represented on an imaginary axis of the complex time domain plane.

4. The method of claim 1 wherein supplying $\alpha$ and $\alpha_i$ includes supplying the complex time domain signals exclusively via an in-phase (I) channel.

5. The method of claim 1 wherein supplying the first and second complex frequency domain symbols includes supplying a plurality of first complex frequency domain symbols ($\alpha_n$) paired with a plurality of second complex frequency domain symbol ($\alpha_{n+i}$);
    wherein mapping $\alpha + \alpha_i$ onto the subcarrier $+f$ includes mapping each ($\alpha_n + j\alpha_{n+i}$) pair onto a subcarrier ($+f_n$);
    wherein mapping ($\alpha - j\alpha_i$)* onto the subcarrier $-f$ includes mapping each ($\alpha_n - j\alpha_{n+i}$)* pair onto a mirror subcarrier ($-f_n$);
    wherein converting the mappings into a complex time domain symbol carrying $\alpha$ and $\alpha_i$ includes converting the mappings into a complex time domain signal carrying $\alpha_n$ and $j\alpha_{n+i}$ in a single IFFT operation;
    wherein supplying $\alpha$ includes simultaneously supplying each $\alpha_n$;
    and, wherein supplying $\alpha_i$ includes simultaneously supplying each $\alpha_{n+i}$.

6. The method of claim 5 further comprising:
    repeating the simultaneous supply of each $\alpha_n$;
    and, repeating the simultaneous supply of each $\alpha_{n+i}$.

7. The method of claim 6 wherein supplying and repeating the supply of each $\alpha_n$, and supplying and repeating the supply of each $\alpha_{n+i}$ includes supplying an ultra-wideband (UWB) signal with a data rate in a range of 80 to 200 megabits per second (Mps).

8. The method of claim 5 further comprising:
    mapping each ($\alpha_n + j\alpha_{n+i}$) pair onto a shifted subcarrier ($+f_{n+k}$);
    mapping each ($\alpha_n - j\alpha_{n+i}$)* pair onto a shifted mirror subcarrier ($-f_{n+k}$);
    converting the shifted subcarrier ($+f_{n+k}$) and shifted mirror subcarrier ($-f_{n+k}$) mappings into complex time domain signal carrying $\alpha_n$ and $j\alpha_{n+i}$ in a single IFFT, subsequent to converting the subcarrier ($+f_n$) and mirror subcarrier ($-f_n$) mappings into a complex time domain symbol;
    supplying each $\alpha_n$ on the shifted subcarriers ($+f_{n+k}$) and shifted mirror subcarriers ($-f_{n+k}$), subsequent to supplying each $\alpha_n$ on the subcarriers ($+f_n$) and mirror subcarriers ($-f_n$);
    and, supplying each $\alpha_{n+i}$ on the shifted subcarriers ($+f_{n+k}$) and shifted mirror subcarriers ($-f_{n+k}$), subsequent to supplying each $\alpha_{n+i}$ on the subcarriers ($+f_n$) and mirror subcarriers ($-f_n$).

9. The method of claim 8 further comprising:
    repeating the supply of each $\alpha_n$ on the subcarriers ($+f_n$) and mirror subcarriers ($-f_n$);
    and,
    repeating the supply of each $\alpha_{n+i}$ on the subcarriers ($+f_n$) and mirror subcarriers ($-f_n$);
    repeating the supply of each $\alpha_n$ on the shifted subcarriers ($+f_{n+k}$) and shifted mirror subcarriers ($-f_{n+k}$);
    and,
    repeating the supply of each $\alpha_{n+i}$ on the shifted subcarriers ($+f_{n+k}$) and shifted mirror subcarriers ($-f_{n+k}$).

10. The method of claim 9 wherein supplying and resupplying $\alpha_n$ and $\alpha_{n+i}$ on the subcarriers ($+f_n$) and mirror subcarriers ($-f_n$), and supplying and resupplying $\alpha_n$ and $\alpha_{n+i}$ on the shifted subcarriers ($+f_{n+k}$) and shifted mirror subcarriers ($-f_{n+k}$) includes supplying a UWB signal with a data rate of 80 megabits per second (Mps), or less.

11. The method of claim 1 wherein supplying $\alpha$ and $\alpha_i$ includes spreading the complex time domain signal in the time domain.

12. The method of claim 1 wherein supplying a real component of the complex time domain symbol ($\alpha$) includes supplying a frequency spread real component;
    and, wherein subsequently supplying an imaginary component of the complex time domain symbol ($\alpha_i$) includes supplying a frequency spread imaginary component.

13. A frequency domain spreading system for the generation of real signals in the time domain, the system comprising:
    a frequency domain spreader (FDS) having an input to accept a first complex frequency domain symbol ($\alpha$) and a second complex frequency domain symbol ($\alpha_i$), the FDS mapping ($\alpha + j\alpha_i$) onto a subcarrier ($+f$) and ($\alpha - j\alpha_i$)* onto a mirror subcarrier ($-f$), and supplying the mappings at an output;

an inverse fast Fourier transformer (IFFT) having an input connected to the FDS output, the IFFT converting the mappings into a complex time domain symbol carrying $\alpha$ and $j\alpha_i$ in single IFFT operation, supplied at an output; and, a radio frequency (RF) transmitter having an input connected to the IFFT output, the RF transmitter having an output to initially supply a real component of the complex time domain signal carrying $\alpha$ and subsequently supply an imaginary component of the complex time domain signal carrying $\alpha_i$.

14. The system of claim 13 wherein the RF transmitter supplies the real symbol components as follows:
the subcarrier (+f) carrying $\alpha$;
and, the mirror subcarrier (−f) carrying $(\alpha)^*$;
and, wherein the RF transmitter supplies the imaginary symbol components as follows:
the subcarrier (+f) carrying $\alpha_i$;
and, the mirror subcarrier (−f) carrying $(\alpha_i)^*$.

15. The system of claim 13 wherein the RF transmitter supplies $\alpha$ and $\alpha_i$ as information represented on a real axis of a complex time domain plane, but not as information represented on an imaginary axis of the complex time domain plane.

16. The system of claim 13 wherein the RF transmitter includes an in-phase (I) channel having an input connected to the IFFT output, and an output to supply $\alpha$ and $\alpha_i$ as complex time domain signals.

17. The system of claim 13 wherein the FDS accepts a plurality of first complex frequency domain symbols $(\alpha_n)$ paired with a plurality of second complex frequency domain symbol $(\alpha_{n+i})$, maps each $(\alpha_n + j\alpha_{n+i})$ pair onto a subcarrier $(+f_n)$, and maps each $(\alpha_{n-j}\alpha_{n+i})^*$ pair onto a mirror subcarrier $(-f_n)$;
wherein the IFFT converts the mappings into a complex time domain signal carrying $\alpha_n$ and $j\alpha_{n+i}$ in a single IFFT operation; and,
wherein the RF transmitter simultaneously supplies each $\alpha_n$ in an initial symbol period, and simultaneously supplies each $\alpha_{n+i}$ in a subsequent symbol period.

18. The system of claim 17 wherein the RF transmitter repeats the supply of each $\alpha_n$ in a symbol period following the initial symbol period, and repeats the supply of each $\alpha_{n+i}$ in a symbol period following the subsequent symbol period.

19. The system of claim 18 wherein the RF transmitter supplies an ultra-wideband (UWB) signal with a data rate in a range of 80 to 200 megabits per second (Mps).

20. The system of claim 17 further comprising:
a shift FDS having an input to accept the plurality of first complex frequency domain symbols $(\alpha_n)$ paired with the plurality of second complex frequency domain symbol $(\alpha_{n+i})$, the shift FDS mapping each $(\alpha_n + j\alpha_{n+i})$ pair onto a shifted subcarrier $(+f_{n+k})$, mapping each $(\alpha_n - j\alpha_{n+i})^*$ pair onto a shifted mirror subcarrier $(-f_{n+k})$, and supplying the mappings at an output;
wherein the IFFT input is connected to the shift FDS output, the IFFT converting the subcarrier $(+f_n)$ and mirror subcarrier $(-f_n)$ mappings into a complex time domain symbol in a first IFFT operation, and converting the shifted subcarrier $(+f_{n+k})$ and shifted mirror subcarrier $(-f_{n+k})$ mappings into complex time domain signal carrying $\alpha_n$ and $j\alpha_{n+i}$ in a second IFFT operation;
wherein the RF transmitter supplies each $\alpha_n$ on the subcarriers $(+f_n)$ and mirror subcarriers $(-f_n)$ in the initial symbol period, and simultaneously supplies each $\alpha_n$ on the shifted subcarriers $(+f_{n+k})$ and shifted mirror subcarriers $(-f_{n+k})$ in a symbol period following the initial symbol period; and,
wherein the RF transmitter supplies each $\alpha_{n+i}$ on the subcarriers $(+f_n)$ and mirror subcarriers $(-f_n)$ in the subsequent symbol period, and simultaneously supplies each $\alpha_{n+i}$ on the shifted subcarriers $(+f_{n+k})$ and shifted mirror subcarriers $(-f_{n+k})$ in a symbol period following the subsequent symbol period.

21. The system of claim 20 wherein the RF transmitter repeats the supply of each $\alpha_n$ on the subcarriers $(+f_n)$ and mirror subcarriers $(-f_n)$, and repeats the supply of each $\alpha_{n+i}$ on the subcarriers $(+f_n)$ and mirror subcarriers $(-f_n)$;
and, wherein the RF transmitter repeats the supply of each $\alpha_n$ on the shifted subcarriers $(+f_{n+k})$ and shifted mirror subcarriers $(-f_{n+k})$, and repeats the supply of each $\alpha_{n+i}$ on the shifted subcarriers $(+f_{n+k})$ and shifted mirror subcarriers $(-f_{n+k})$.

22. The system of claim 21 wherein the RF transmitter supplies a UWB signal with a data rate of 80 megabits per second (Mps), or less.

23. The system of claim 13 wherein the RF transmitter repeats the supply of $\alpha$ and $\alpha_i$, spreading the complex time domain signal in the time domain.

24. The system of claim 13 wherein the RF transmitter supplies a frequency spread real component of the complex time domain symbol $(\alpha)$, and a frequency spread imaginary component of the complex time domain symbol $(\alpha_i)$.

25. A machine-readable medium having stored thereon instructions for using frequency domain spreading to generate real signals in the time domain, the instructions:
supplying a first complex frequency domain symbol $(\alpha)$ and a second complex frequency domain symbol $(\alpha_i)$;
mapping $(\alpha + j\alpha_i)$ onto a subcarrier (+f);
mapping $(\alpha - j\alpha_i)^*$ onto a mirror subcarrier (−f);
converting the mappings into a complex time domain symbol carrying $\alpha$ and $j\alpha_i$ in a single inverse fast Fourier transformation (IFFT);
supplying a real component of the complex time domain symbol $\alpha$; and,
subsequently an imaginary component of the complex time domain symbol supplying $\alpha_i$.

26. A frequency domain spreading device for the generation of real signals in the time domain, the device comprising:
a frequency domain spreading (FDS) means having an input to accept a first complex frequency domain symbol $(\alpha)$ and a second complex frequency domain symbol $(\alpha_i)$, the FDS means mapping $(\alpha + j\alpha_i)$ onto a subcarrier (+f) and $(\alpha - j\alpha_i)^*$ onto a mirror subcarrier (−f), and supplying the mappings at an output;
an inverse fast Fourier transformation (IFFT) means having an input connected to the FDS means output, the IFFT means converting the mappings into a complex time domain symbol carrying $\alpha$ and $j\alpha_i$ in single IFFT operation, supplied at an output;
and, a radio frequency (RF) transmission means having an input connected to the IFFT means output, the RF transmission means having an output to initially supply a real component of the complex time domain signal carrying $\alpha$ and subsequently supply an imaginary component of the complex time domain signal carrying $\alpha_i$.

27. The device of claim 26 wherein the RF transmission means supplies the real symbol components as follows:
the subcarrier (+f) carrying $\alpha$;
and, the mirror subcarrier (−f) carrying $(\alpha)^*$;
and, wherein the RF transmission means supplies the imaginary symbol components as follows:
the subcarrier (+f) carrying $\alpha_i$;
and, the mirror subcarrier (−f) carrying $(\alpha_i)^*$.

28. The device of claim 26 wherein the RF transmission means supplies $\alpha$ and $\alpha_i$ as information represented on a real axis of a complex time domain plane, but not as information represented on an imaginary axis of the complex time domain plane.

29. The device of claim 26 wherein the RF transmission means includes an in-phase (I) channel means having an input connected to the IFFT means output, and an output to supply $\alpha$ and $\alpha_i$ as complex time domain signals.

30. The device of claim 26 wherein the FDS means accepts a plurality of first complex frequency domain symbols ($\alpha_n$) paired with a plurality of second complex frequency domain symbol ($\alpha_{n+i}$), maps each ($\alpha_n + j\alpha_{n+i}$) pair onto a subcarrier (+$f_n$), and maps each $(\alpha_n − j\alpha_{n+i})^*$ pair onto a mirror subcarrier (−$f_n$);
wherein the IFFT means converts the mappings into a complex time domain signal carrying $\alpha_n$ and $j\alpha_{n+i}$ in a single IFFT operation;
and, wherein the RF transmission means simultaneously supplies each $\alpha_n$ in an initial symbol period, and simultaneously supplies each $\alpha_{n+i}$ in a subsequent symbol period.

31. The device of claim 30 wherein the RF transmission means repeats the supply of each $\alpha_n$ in a symbol period following the initial symbol period, and repeats the supply of each $\alpha_{n+i}$ in a symbol period following the subsequent symbol period.

32. The device of claim 31 wherein the RF transmission means supplies an ultra-wideband (UWB) signal with a data rate in a range of 80 to 200 megabits per second (Mps).

33. The device of claim 30 further comprising:
a shift FDS means having an input to accept the plurality of first complex frequency domain symbols ($\alpha_n$) paired with the plurality of second complex frequency domain symbol ($\alpha_{n+i}$), the shift FDS means mapping each ($\alpha_n + j\alpha_{n+i}$) pair onto a shifted subcarrier (+$f_{n+k}$), mapping each $(\alpha_n − j\alpha_{n+i})^*$ pair onto a shifted mirror subcarrier (−$f_{n+k}$), and supplying the mappings at an output;
wherein the IFFT means input is connected to the shift FDS means output, the IFFT means converting the subcarrier (+$f_n$) and mirror subcarrier (−$f_n$) mappings into a complex time domain symbol in a first IFFT operation, and converting the shifted subcarrier (+$f_{n+k}$) and shifted mirror subcarrier (−$f_{n+k}$) mappings into complex time domain signal carrying $\alpha_n$ and $j\alpha_{n+i}$ in a second IFFT operation;
wherein the RF transmission means supplies each $\alpha_n$ on the subcarriers (+$f_n$) and mirror subcarriers (−$f_n$) in the initial symbol period, and simultaneously supplies each $\alpha_n$ on the shifted subcarriers (+$f_{n+k}$) and shifted mirror subcarriers (−$f_{n+k}$) in a symbol period following the initial symbol period;
and, wherein the RF transmission means supplies each $\alpha_{n+i}$ on the subcarriers (+$f_n$) and mirror subcarriers (−$f_n$) in the subsequent symbol period, and simultaneously supplies each $\alpha_{n+i}$ on the shifted subcarriers (+$f_{n+k}$) and shifted mirror subcarriers (−$f_{n+k}$) in a symbol period following the subsequent symbol period.

34. The device of claim 33 wherein the RF transmission means repeats the supply of each $\alpha_n$ on the subcarriers (+$f_n$) and mirror subcarriers (−$f_n$), and repeats the supply of each $\alpha_{n+i}$ on the subcarriers (+$f_n$) and mirror subcarriers (−$f_n$);
and, wherein the RF transmission means repeats the supply of each $\alpha_n$ on the shifted subcarriers (+$f_{n+k}$) and shifted mirror subcarriers (−$f_{n+k}$), and repeats the supply of each $\alpha_{n+i}$ on the shifted subcarriers (+$f_{n+k}$) and shifted mirror subcarriers (−$f_{n+k}$).

35. The device of claim 34 wherein the RF transmission means supplies a UWB signal with a data rate of 80 megabits per second (Mps), or less.

36. The device of claim 26 wherein the RF transmission means repeats the supply of $\alpha$ and $\alpha_i$, spreading the complex time domain signal in the time domain.

37. The device of claim 26 wherein the RF transmission means supplies a frequency spread real component of the complex time domain symbol ($\alpha$), and a frequency spread imaginary component of the complex time domain symbol ($\alpha_i$).

38. A processing device using frequency domain spreading to generate real signals in the time domain, the processing device comprising:
a frequency domain spreading (FDS) module having an input to accept a first complex frequency domain symbol ($\alpha$) and a second complex frequency domain symbol ($\alpha_i$), the FDS module mapping ($\alpha + j\alpha_i$) onto a subcarrier (+f) and $(\alpha − j\alpha_i)^*$ onto a mirror subcarrier (−f), and supplying the mappings at an output;
an inverse fast Fourier transformation (IFFT) module having an input connected to the FDS module output, the IFFT module converting the mappings into a complex time domain symbol carrying $\alpha$ and j$\alpha$hd i in single IFFT operation, supplied at an output;
and, a radio frequency (RF) transmission module having an input connected to the IFFT module output, the RF transmission module having an output to initially supply a real component of the complex time domain signal carrying a and subsequently supply an imaginary component of the complex time domain signal carrying $\alpha_i$.

* * * * *